United States Patent
Kanamaru

(10) Patent No.: US 9,667,832 B2
(45) Date of Patent: May 30, 2017

(54) IMAGE PROCESSING APPARATUS

(71) Applicant: KYOCERA Document Solutions Inc., Osaka (JP)

(72) Inventor: Kazuhiro Kanamaru, Osaka (JP)

(73) Assignee: Kyocera Document Solutions, Inc. (JP)

(*) Notice: Subject to any disclaimer, the term of this patent is extended or adjusted under 35 U.S.C. 154(b) by 0 days.

(21) Appl. No.: 15/162,440

(22) Filed: May 23, 2016

(65) Prior Publication Data

US 2016/0352968 A1    Dec. 1, 2016

(30) Foreign Application Priority Data

May 27, 2015 (JP) .................................. 2015-106921

(51) Int. Cl.
  *H04N 1/387*   (2006.01)
  *H04N 1/409*   (2006.01)

(52) U.S. Cl.
  CPC . *H04N 1/4097* (2013.01); *H04N 2201/04717* (2013.01)

(58) Field of Classification Search
  None
  See application file for complete search history.

(56) References Cited

U.S. PATENT DOCUMENTS

2010/0135680 A1* 6/2010 Adachi .................. G03G 15/70
                                                              399/16

FOREIGN PATENT DOCUMENTS

JP    2005-109807    4/2005
JP    2006-084595    3/2006

* cited by examiner

*Primary Examiner* — Helen Q Zong

(57) ABSTRACT

In an image processing apparatus, a specific local gradation pattern detecting unit detects a specific local gradation pattern in a density distribution of a pixel array in a secondary scanning direction at each one of plural sampling positions along a primary scanning direction in a document image. A crease detecting unit detects a crease on the basis of positions in the primary scanning direction and positions in the secondary scanning direction of plural specific local gradation patterns detected for the plural sampling positions along the primary scanning direction. A crease removing unit removes the detected crease. The specific local gradation pattern has a density distribution that monotonically increases from a background density to a local peak density and monotonically decreases from the local peak density to the background density in the secondary scanning direction.

7 Claims, 5 Drawing Sheets

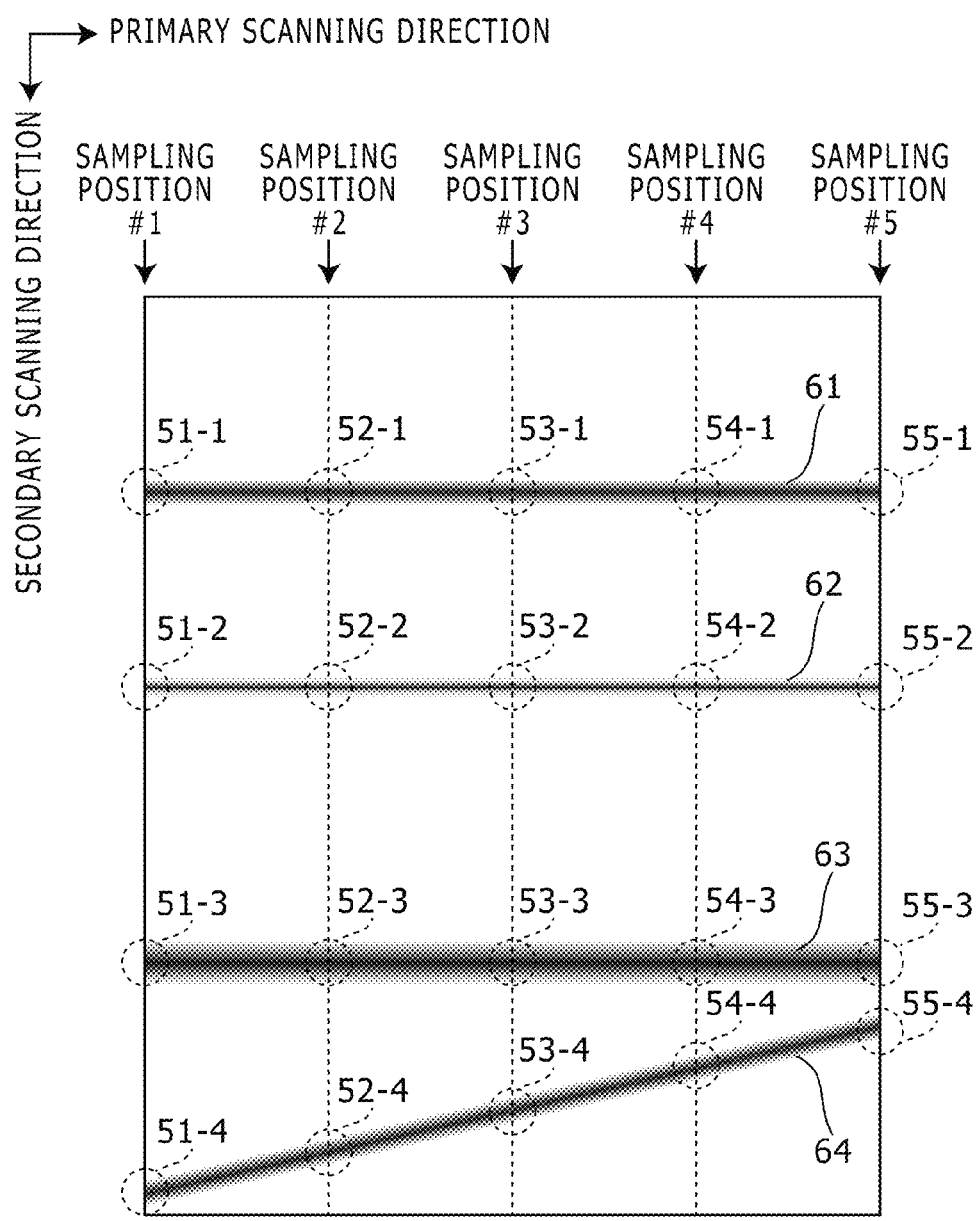

IMAGE PROCESSING APPARATUS

CROSS-REFERENCE TO RELATED APPLICATIONS

This application relates to and claims priority rights from Japanese Patent Application No. 2015-106921, filed on May 27, 2015, the entire disclosures of which are hereby incorporated by reference herein.

BACKGROUND

1. Field of the Present Disclosure

The present disclosure relates to an image processing apparatus.

2. Description of the Related Art

When scanning an image of a document that includes a crease, a crease part rises from its neighborhood and creates a shadow, and consequently in the scanned document image, the crease part appears as a linear image.

Therefore it is sometimes required to remove the image of the crease part distinguished from an object (i.e. a character, a figure, a photograph or the like) in the document.

An image processing apparatus (as a first image processing apparatus) identifies a spatial frequency distribution of the scanned document image, and determines a part having a low spatial frequency as a binding part.

Another image processing apparatus (as a second image processing apparatus) (a) scans a document image of a document without wrinkles and a document image of a document with wrinkles and detects wrinkles by comparing these document images or (b) scans a front surface image and a back surface image of a document with wrinkles and detects wrinkles by comparing these surface images.

However, a width of the crease is small and therefore the crease part has a high spatial frequency, and consequently in the aforementioned first image processing apparatus, it is difficult to distinguish the crease from an object in the document image.

Further, the aforementioned second image processing apparatus requires extra image scanning other than image scanning for a surface (i.e. single surface) that includes an object such as character, figure or photograph in the document.

SUMMARY

An image processing apparatus according to an aspect of the present disclosure includes a specific local gradation pattern detecting unit, a crease detecting unit, and a crease removing unit. The specific local gradation pattern detecting unit is configured to detect a specific local gradation pattern in a density distribution of a pixel array in a secondary scanning direction at each one of plural sampling positions along a primary scanning direction in a document image. The crease detecting unit is configured to detect a crease on the basis of positions in the primary scanning direction and positions in the secondary scanning direction of plural specific local gradation patterns detected for the plural sampling positions along the primary scanning direction. The crease removing unit is configured to remove the detected crease. The specific local gradation pattern has a density distribution that monotonically increases from a background density to a local peak density and monotonically decreases from the local peak density to the background density in the secondary scanning direction.

These and other objects, features and advantages of the present disclosure will become more apparent upon reading of the following detailed description along with the accompanied drawings.

BRIEF DESCRIPTION OF THE DRAWINGS

FIG. 5 shows a diagram that indicates an example of a specific local gradation pattern detected in the document image shown in FIG. 4.

DETAILED DESCRIPTION

Hereinafter, an embodiment according to an aspect of the present disclose will be explained with reference to drawings.

Figure 1:
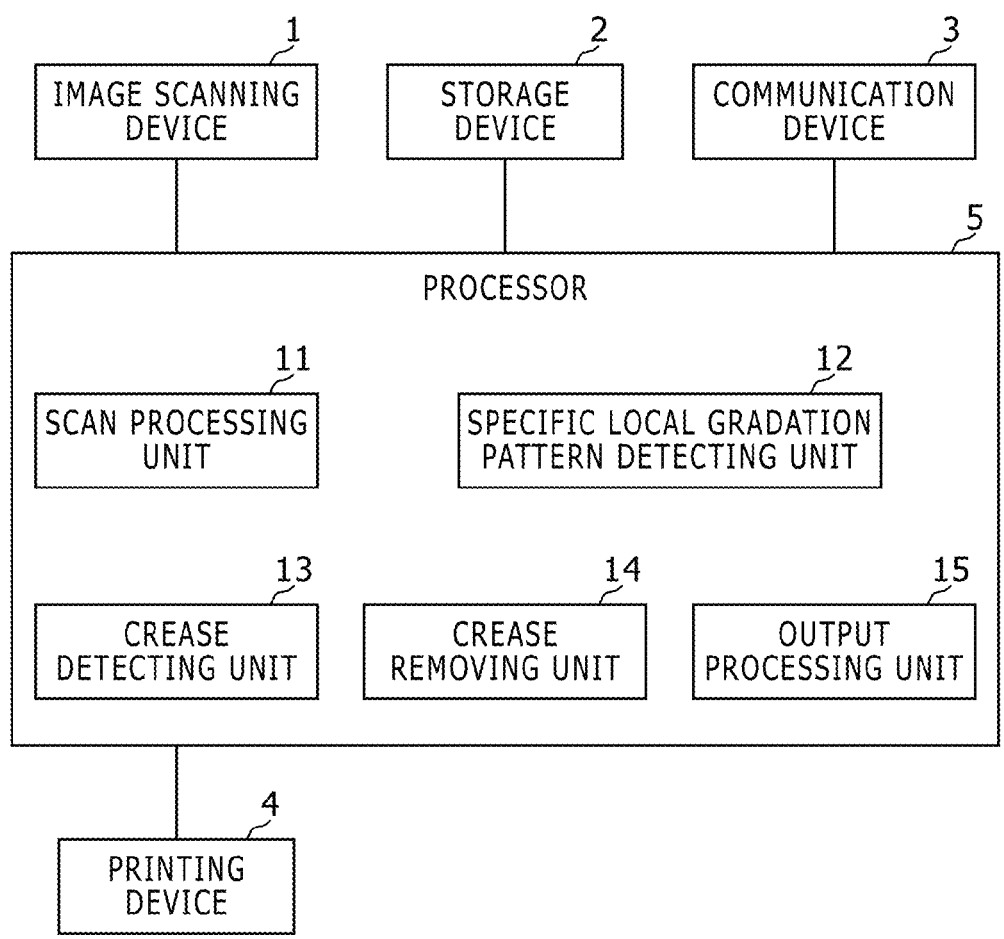
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. This image processing apparatus includes an image scanning device 1, a storage device 2, a communication device 3, a printing device 4, and a processor 5.

The image scanning device 1 is an internal device that optically scans a document image of a document, and generates image data (RGB data, here) of the document image.

The storage device 2 is a device capable of storing data and programs. A non-volatile storage medium with a large capacity is used as the storage device 2, such as non-volatile memory or hard disk drive. The storage device 2 is enabled, for example, to store the image data of the document image.

The communicating device 3 is a device which performs data communication with an external device. A network interface which performs network communication, a modem which performs facsimile communication or the like is used as the communicating device 3.

The printing device 4 performs printing of a document image based on image data of the document image for which image processing has been processed such as color conversion and halftone process for printing.

The processor 5 is a computer that includes a CPU (Central Processing Unit), a ROM (Read Only Memory), a RAM (Random Access Memory) and the like, loads a program from the ROM or the storage device 2 to the RAM, and executes the program with the CPU to embody various processing units. In this embodiment, the processor 5 acts as a scan processing unit 11, a specific local gradation pattern detecting unit 12, a crease detecting unit 13, a crease removing unit 14, and an output processing unit 15.

The scan processing unit 11 controls the image scanning device 1, and thereby obtains a document image and stores image data of the document image in the storage device 2, the RAM, or the like.

The specific local gradation pattern detecting unit 12 reads image data of the document image, and detects a specific local gradation pattern in a density distribution of a pixel array in a secondary scanning direction at each one of plural sampling positions (i.e. pixel positions) along a primary scanning direction in the document image.

Figure 2:
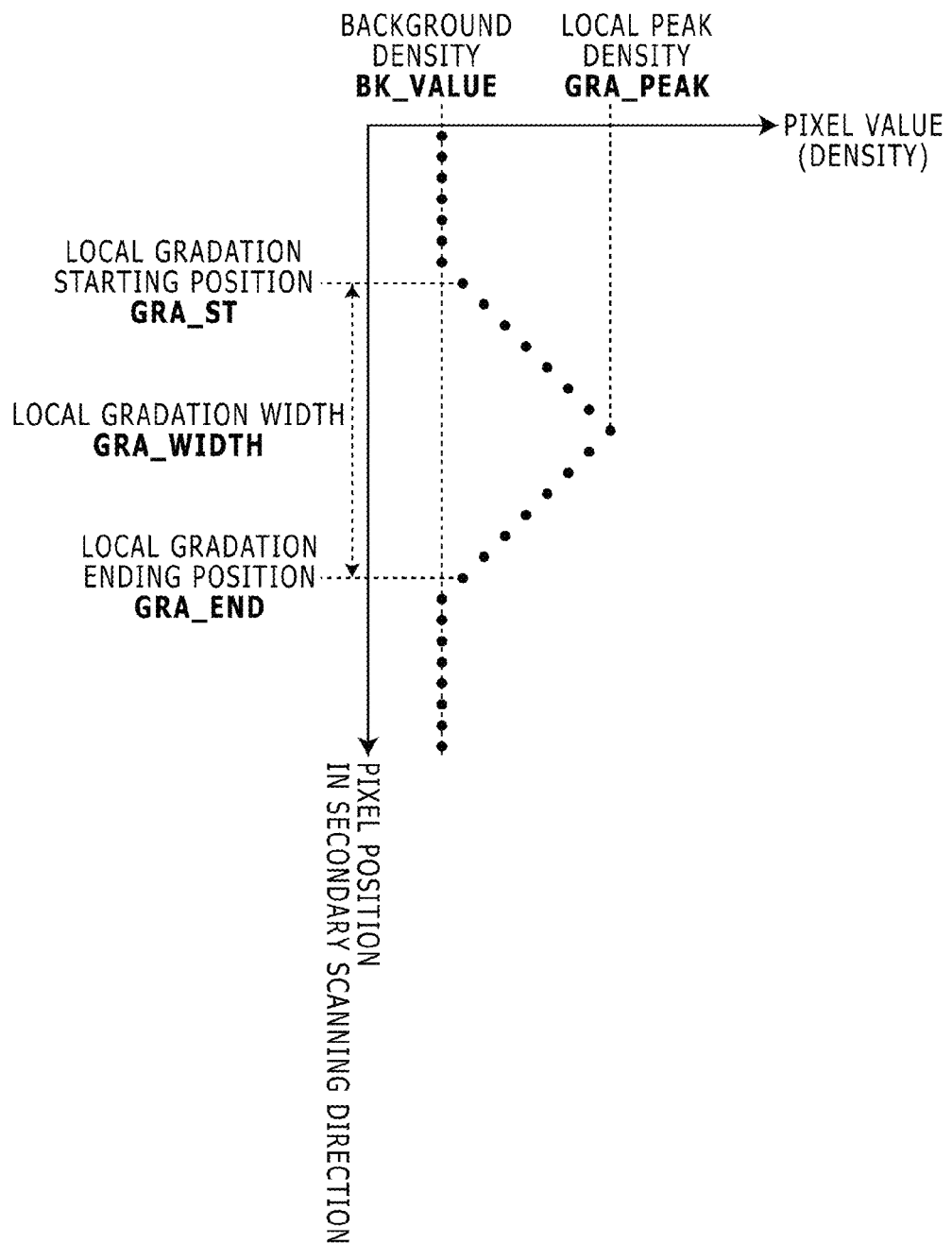
FIG. 2 shows a diagram that includes an example of a density distribution of a specific local gradation pattern.

FIG. 2 is a figure showing an example of the density of specific local gradation distribution. As shown in FIG. 2, the aforementioned specific local gradation pattern has a density distribution that monotonically increases from a background density BK_VALUE to a local peak density GRA_PEAK and monotonically decreases from the local peak density GRA_PEAK to the background density BK_VALUE in the secondary scanning direction.

The background density BK_VALUE is a surface density of a sheet of the document or a density of a background image of the document.

Therefore, for example, even if a section in the pixel array has a higher density than the background density but this section has a density distribution that includes plural peaks, then this section is not detected as a specific local gradation pattern. Consequently, an image object such as photograph having density gradation tends not to be improperly detected as a crease.

Further, for example, even if a section in the pixel array has a higher density than the background density but this section has plural successive pixels that have a peak density, then this section is not detected as a specific local gradation pattern. Consequently, an image object such as character or line drawing that has a solid density tends not to be improperly detected as a crease.

The crease detecting unit 13 detects a crease on the basis of positions in the primary scanning direction and positions in the secondary scanning direction of plural specific local gradation patterns detected by the specific local gradation pattern detecting unit 12 for the respective plural sampling positions along the primary scanning direction.

Specifically, if the plural specific local gradation patterns linearly lay, the crease detecting unit 13 detects as a crease a linear part that passes at positions of the plural specific local gradation patterns.

For example, this linear part is an area between a straight line that passes starting positions GRA_ST (see FIG. 2) of the respective plural specific local gradation patterns detected at the plural sampling positions and a straight line that passes ending positions GRA_END (see FIG. 2) of the respective plural specific local gradation patterns detected at the plural sampling positions.

Further, the crease detecting unit 13 determines a set of specific local gradation patterns at the respective plural sampling positions so that the specific local gradation patterns have (a) starting positions GRA_ST in the secondary scanning direction that agree with each other within a predetermined error, (b) widths GRA_WIDTH in the secondary scanning direction that agree with each other within a predetermined error, and (c) the local peak densities GRA_PEAK that agree with each other within a predetermined error; and detects a crease on the basis of positions in the primary scanning direction and positions in the secondary scanning direction of the specific local gradation patterns that belong the determined set.

When the crease detecting unit 13 determines plural sets of specific local gradation patterns at the respective plural sampling positions in the aforementioned manner, the crease detecting unit 13 detects plural creases corresponding to the respective determined plural sets.

Even if at a part of the sampling positions, the crease detecting unit 13 does not detect the specific local gradation pattern that has (a) the starting position GRA_ST that agrees within a predetermined error, (b) the width GRA_WIDTH that agrees within a predetermined error, and (c) the local peak density GRA_PEAK that agrees within predetermined error (namely, does not detect a specific local gradation pattern that has the substantially same density distribution as others), but the number of sampling positions at which specific local gradation patterns with the substantially same density distributions are detected exceeds a predetermined threshold value GRA_SAMPLE_NUM, then the crease detecting unit 13 may determine a set of the detected specific local gradation patterns with the substantially same density distributions, and may detect a crease on the basis of positions in the primary scanning direction and positions in the secondary scanning direction of the specific local gradation patterns that belong the determined set.

Therefore, in this case, if the number of sampling positions at which specific local gradation patterns with the substantially same density distributions are detected is equal to or less than the predetermined threshold value GRA_SAMPLE_NUM, then the crease detecting unit 13 does not detect a crease corresponding to the detected specific local gradation patterns with the substantially same density distributions.

The crease removing unit 14 removes the crease detected by the crease detecting unit 13.

For example, the crease removing unit 14 replaces a density of the detected crease (i.e. a part having a higher density than a density of its neighborhood) with a density of neighborhood pixels (i.e. background pixels) or with a density obtained by interpolation between neighborhood pixels and thereby removes the crease.

For the document image in which a crease has been removed, the output processing unit 15 performs image processing necessary for printing such as color conversion (here, color conversion from RGB to CMYK) and halftone process (e.g. binarization process using an error diffusion method), and causes the printing device 4 to perform printing of the document image based on image data of the document image after the image processing.

Further, using the communication device 3, the output processing unit 15 may transmit to an external device the image data of the document image in which a crease has been removed.

Figure 3:
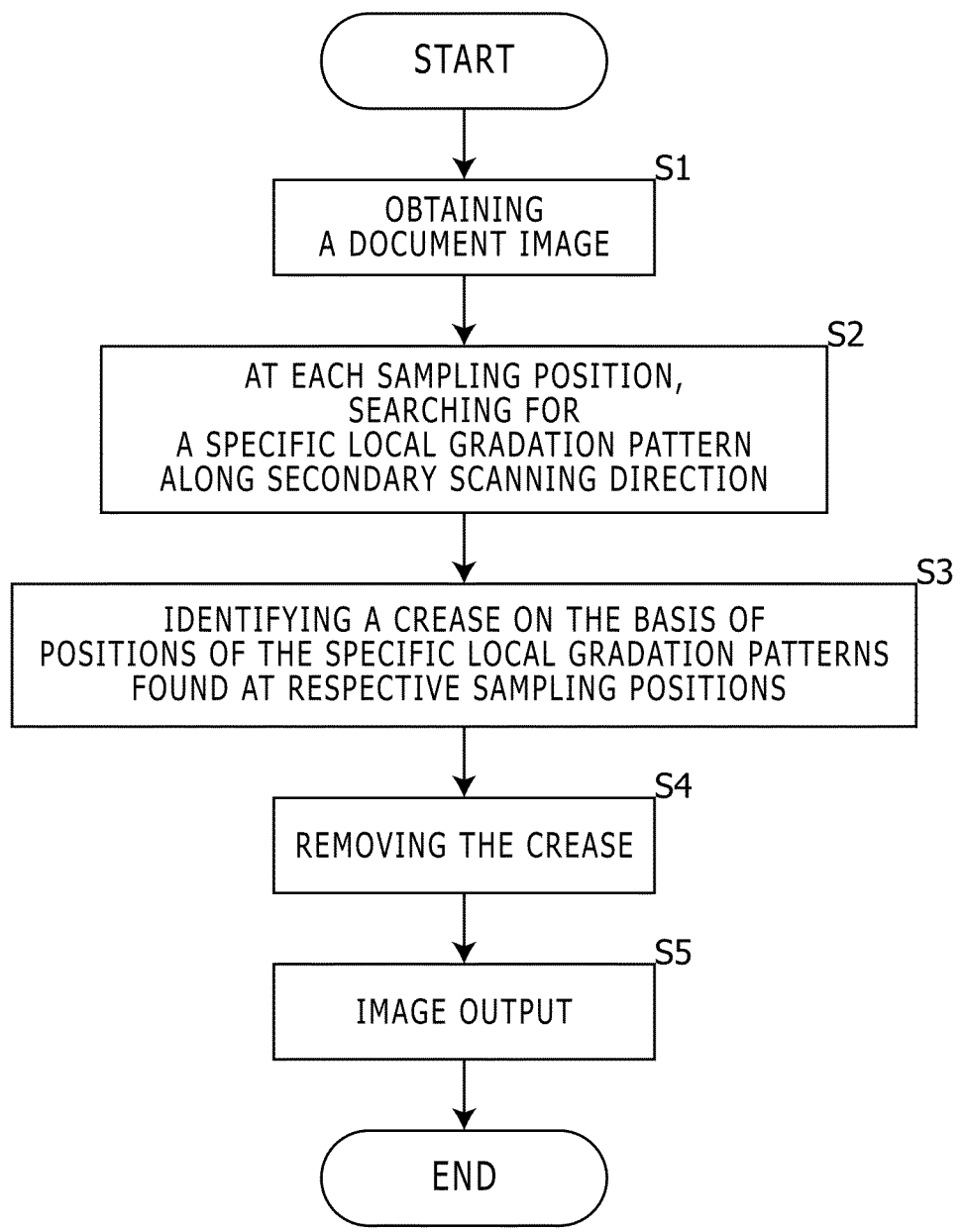
FIG. 3 shows a flowchart that explains a behavior of the image processing apparatus shown in FIG. 1.

The following part explains a behavior of the aforementioned apparatus. FIG. 3 shows a flowchart that explains a behavior of the image processing apparatus shown in FIG. 1.

When detecting a predetermined user operation using an unshown operation panel, the scan processing unit 11 controls the image scanning device 1 and thereby obtains a document image of a document set on the image scanning device 1 and stores image data of the document image in the storage device 2, the RAM, or the like (in Step S1).

Subsequently, at each one of predetermined sampling positions along a primary scanning direction in the document image, the specific local gradation pattern detecting unit 12 extracts pixel values (i.e. densities) of a pixel array in a secondary scanning direction for the image data of the document image, searches a density distribution of the pixel array for a specific local gradation pattern in the secondary scanning direction, and thereby detects a specific local gradation pattern (in Step S2).

Figure 4:
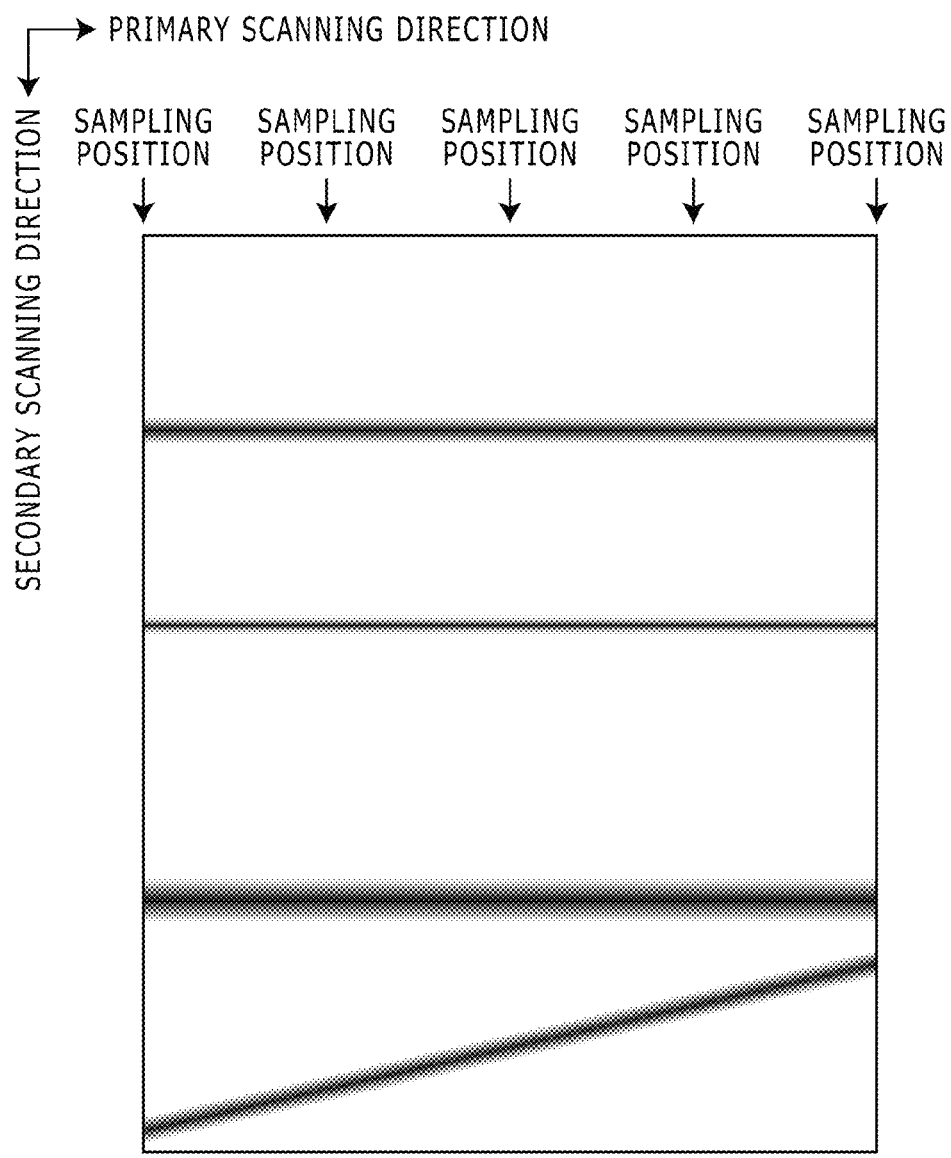
FIG. 4 shows a diagram that indicates an example of a document image that includes a crease.

FIG. 4 shows a diagram that indicates an example of a document image that includes a crease. FIG. 5 shows a diagram that indicates an example of a specific local gradation pattern detected in the document image shown in FIG. 4. For example, a document image shown in FIG. 4 includes four creases, and specific local gradation patterns are detected at each one of five sampling positions including both ends of the document image. In FIG. 5, the number of the sampling positions are 5. Alternatively, the number of the sampling positions may be another amount more than 1. In this case, as shown in FIG. 5, at each one of the sampling positions, four specific local gradation patterns are detected. Specifically, at the sampling position #1, the specific local gradation patterns 51-1 to 51-4 are detected; at the sampling position #2, the specific local gradation patterns 52-1 to 52-4 are detected; at the sampling position #3, the specific local gradation patterns 53-1 to 53-4 are detected; at the sampling position #4, the specific local gradation patterns 54-1 to 54-4 are detected; and at the sampling position #5, the specific local gradation patterns 55-1 to 55-4 are detected.

Subsequently, the crease detecting unit 13 detects a crease in the aforementioned manner on the basis of positions in the primary scanning direction and positions in the second scanning direction of the plural specific local gradation pattern detected at the respective plural sampling positions (in Step S3).

For example, if the specific local gradation patterns 51-1 to 51-4, 52-1 to 52-4, 53-1 to 53-4, 54-1 to 54-4 and 55-1 to 55-4 as shown in FIG. 5 are detected, then a crease 61 is detected on the basis of the specific local gradation patterns 51-1, 52-1, 53-1, 54-1 and 55-1 that have substantially same density distributions as each other, a crease 62 is detected on the basis of the specific local gradation patterns 51-2, 52-2, 53-2, 54-2 and 55-2 that have substantially same density distributions as each other, a crease 63 is detected on the basis of the specific local gradation patterns 51-3, 52-3, 53-3, 54-3 and 55-3 that have substantially same density distributions as each other, a crease 64 is detected on the basis of the specific local gradation patterns 51-4, 52-4, 53-4, 54-4 and 55-4 that have substantially same density distributions as each other, and a crease 65 is detected on the basis of the specific local gradation patterns 51-5, 52-5, 53-5, 54-5 and 55-5 that have substantially same density distributions as each other.

Subsequently, the crease removing unit 14 removes the crease detected by the crease detecting unit 13 (in Step S4).

The output processing unit 15 performs (a) printing of the document image in which a crease has been removed and/or (b) transmission of image data of the document image in which a crease has been removed (in Step S5).

As mentioned, in Embodiment 1, the specific local gradation pattern detecting unit 12 detects a specific local gradation pattern in a density distribution of a pixel array in a secondary scanning direction at each one of plural sampling positions along a primary scanning direction in a document image. The crease detecting unit 13 detects a crease on the basis of positions in the primary scanning direction and positions in the secondary scanning direction of plural specific local gradation patterns detected by the specific local gradation pattern detecting unit 12 for the plural sampling positions along the primary scanning direction. The crease removing unit 14 removes the crease detected by the crease detecting unit 13.

Therefore, without extra image scanning such as image scanning of a back surface of a document, a crease is detected and removed in a document image of a front surface that includes an image object such as character, figure or photograph. Further, without improperly removing an image object other than a crease, a crease is removed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the specific local gradation pattern may be limited to a pixel array section that has a density of a pixel at a starting position of the section where a difference between the background density and the density of the pixel at the starting position is equal to or less than a predetermined threshold value. In such a case, if the difference between the background density and the density of the pixel at the starting position exceeds the predetermined threshold value in a pixel array section, then such a pixel array section is not detected as a specific local gradation pattern.

Further, the specific local gradation pattern may be limited to a pixel array section that has the local peak density that is equal to or less than a predetermined threshold value. In such a case, if the local peak density exceeds the predetermined threshold value in a pixel array section, then such a pixel array section is not detected as a specific local gradation pattern.

What is claimed is:

1. An image processing apparatus, comprising:
a specific local gradation pattern detecting unit configured to detect a specific local gradation pattern in a density distribution of a pixel array in a secondary scanning direction at each one of plural sampling positions along a primary scanning direction in a document image;
a crease detecting unit configured to detect a crease on the basis of positions in the primary scanning direction and positions in the secondary scanning direction of plural specific local gradation patterns detected by the specific local gradation pattern detecting unit for the plural sampling positions along the primary scanning direction; and
a crease removing unit configured to remove the detected crease;
wherein the specific local gradation pattern has a density distribution that monotonically increases from a background density to a local peak density and monotonically decreases from the local peak density to the background density in the secondary scanning direction.

2. The image processing apparatus according to claim 1, wherein if the plural specific local gradation patterns linearly lay, the crease detecting unit detects as a crease a linear part that passes at positions of the plural specific local gradation patterns.

3. The image processing apparatus according to claim 1, wherein the crease detecting unit determines a set of specific local gradation patterns at the respective plural sampling positions so that the specific local gradation patterns have (a) starting positions in the secondary scanning direction that agree with each other within a predetermined error, (b) widths in the secondary scanning direction that agree with each other within a predetermined error, and (c) the local peak densities that agree with each other within a predetermined error; and detects a crease on the basis of positions in the primary scanning direction and positions in the secondary scanning direction of the specific local gradation patterns that belong the determined set.

4. The image processing apparatus according to claim 3, wherein the crease detecting unit determines plural sets of specific local gradation patterns at the respective plural sampling positions so that in each one of the plural sets the specific local gradation patterns have (a) starting positions in the secondary scanning direction that agree with each other within a predetermined error, (b) widths in the secondary scanning direction that agree with each other within a predetermined error, and (c) the local peak densities that agree with each other within a predetermined error; and detects plural creases corresponding to the respective determined plural sets.

5. The image processing apparatus according to claim 3, wherein (a) if among the sampling positions the number of sampling positions at which the starting positions agree with each other within the predetermined error, the widths agree with each other within the predetermined error and the local peak densities agree with each other within the predetermined error exceeds a predetermined threshold value, the crease detecting unit determines a set of the detected specific local peak gradation patterns and detects a crease on the basis of positions in the primary scanning direction and positions in the secondary scanning direction of the specific local gradation patterns that belong the determined set; and (b) if among the sampling positions the number of sampling positions at which the starting positions agree with each other within the predetermined error, the widths agree with each other within the predetermined error and the local peak densities agree with each other within the predetermined error is equal to or less than the predetermined threshold value, the crease detecting unit does not detect a crease corresponding to the detected specific local gradation patterns.

6. The image processing apparatus according to claim 1, wherein the specific local gradation pattern has a density of a pixel at a starting position of the specific local gradation pattern, and a difference between the background density and the density of the pixel at the starting position is equal to or less than a predetermined threshold value.

7. The image processing apparatus according to claim 1, wherein the specific local gradation pattern has the local peak density that is equal to or less than a predetermined threshold value.

* * * * *